US011717386B2

(12) United States Patent
Specht et al.

(10) Patent No.: US 11,717,386 B2
(45) Date of Patent: Aug. 8, 2023

(54) METHOD FOR SPECIFYING A MATERIAL COLOR OF A DENTAL RESTORATION

(71) Applicant: Ivoclar Vivadent AG, Schaan (LI)

(72) Inventors: Tobias Specht, Ruggell (LI); Oliver Voigt, Galgenen (CH); Michael Mueller, Klaus (AT); Harald Kerschbaumer, Klaus (AT)

(73) Assignee: Ivoclar Vivadent AG, Schaan (LI)

( * ) Notice: Subject to any disclaimer, the term of this patent is extended or adjusted under 35 U.S.C. 154(b) by 508 days.

(21) Appl. No.: 16/486,899

(22) PCT Filed: Mar. 8, 2018

(86) PCT No.: PCT/EP2018/055821
§ 371 (c)(1),
(2) Date: Aug. 19, 2019

(87) PCT Pub. No.: WO2018/162671
PCT Pub. Date: Sep. 13, 2018

(65) Prior Publication Data
US 2020/0000563 A1    Jan. 2, 2020

(30) Foreign Application Priority Data

Mar. 8, 2017  (EP) ..................................... 17159883

(51) Int. Cl.
*A61C 13/08*    (2006.01)
*A61C 13/00*    (2006.01)

(52) U.S. Cl.
CPC ........ *A61C 13/082* (2013.01); *A61C 13/0004* (2013.01)

(58) Field of Classification Search
CPC ..... A61C 13/082; A61C 13/004; A61C 13/09; A61C 13/081; A61C 13/083; A61C 5/20;
(Continued)

(56) References Cited

U.S. PATENT DOCUMENTS 2,474,676 A *  6/1949  Ernest .................. A61C 13/081
                                                            264/516
9,649,180 B2 * 5/2017  Morales ................. A61C 13/08
(Continued)

FOREIGN PATENT DOCUMENTS

JP          2005176915 A       7/2005

OTHER PUBLICATIONS

Shuli Wang, Weiting Wang, Fan Wu, "A Computer-Aided Analysis on Dental Prosthesis Shade Matching" 2011, 4th International Conference on Biomedical Engineering and INformatics (BMEI) (Year: 2011).*

(Continued)

*Primary Examiner* — Ralph A Lewis
(74) *Attorney, Agent, or Firm* — Ann M. Knab; Thad McMurray

(57) ABSTRACT

The invention relates to a computer program for specifying a material color of a dental restoration for which the desired tooth color is entered as a target tooth color (56) by the user, said target tooth color being the tooth color of a neighboring tooth, wherein upon specification of the material color of the dental restoration starting from the target tooth color (56) the material color of the dental restoration material is changed based on parameters such as the color of a stump and/or an abutment, the layer thickness of the dental restoration, the type of the dental restoration as well as the processing technique, wherein the specification of the material color of the dental restoration is controlled by the computer program, and wherein, once a parameter is selected, the next parameter is offered automatically, wherein the selection is limited based on parameters which are dependent on one another, such as the layer thickness, the restoration type, that is to say the indication, and the material.

20 Claims, 13 Drawing Sheets

(58) Field of Classification Search
CPC ... A61C 19/10; A61C 19/04; A61C 2201/002; G01J 3/508; G01J 3/51; G01J 3/52; A61B 5/4547; A61B 5/1032
See application file for complete search history.

(56) References Cited

U.S. PATENT DOCUMENTS

| | | | | |
|---|---|---|---|---|
| 2003/0124481 | A1* | 7/2003 | Zun | A61C 19/10 433/203.1 |
| 2003/0207235 | A1* | 11/2003 | der Zel | A61C 13/0004 433/223 |
| 2004/0167646 | A1* | 8/2004 | Jelonek | A61C 13/0004 707/999.107 |
| 2005/0112522 | A1* | 5/2005 | Riley | A61C 19/10 433/26 |
| 2005/0170315 | A1* | 8/2005 | Strobel | A61C 13/082 433/203.1 |
| 2005/0283065 | A1* | 12/2005 | Babayoff | A61C 9/0066 600/407 |
| 2006/0008777 | A1* | 1/2006 | Peterson | A61C 13/0004 433/223 |
| 2006/0147874 | A1* | 7/2006 | Touchstone | A61C 13/082 433/26 |
| 2006/0177792 | A1* | 8/2006 | Touchstone | A61C 19/04 433/223 |
| 2007/0026363 | A1* | 2/2007 | Lehmann | G16H 40/67 433/223 |
| 2007/0212667 | A1* | 9/2007 | Jung | A61C 5/77 433/223 |
| 2008/0160485 | A1* | 7/2008 | Touchstone | A61C 13/0004 433/215 |
| 2009/0133260 | A1* | 5/2009 | Durbin | A61C 13/0004 29/896.11 |
| 2010/0076581 | A1* | 3/2010 | Violante | A61C 9/0046 433/199.1 |
| 2010/0260924 | A1* | 10/2010 | Karim | A61C 13/082 427/2.26 |
| 2011/0256507 | A1* | 10/2011 | Chiu | A61C 13/0004 427/2.29 |
| 2014/0255875 | A1* | 9/2014 | Saliger | A61C 5/70 433/223 |
| 2014/0372085 | A1* | 12/2014 | Korten | G06F 30/00 703/1 |
| 2017/0165038 | A1* | 6/2017 | Esbech | G01J 3/504 |
| 2020/0000563 | A1* | 1/2020 | Specht | A61C 13/0004 |
| 2021/0251733 | A1* | 8/2021 | Muller | A61C 5/20 |

OTHER PUBLICATIONS

Voclar Vivadent G"IPS Natural Die Material, Short Instructions," Brochure, 4 pages, Jan. 2017.

\* cited by examiner

METHOD FOR SPECIFYING A MATERIAL COLOR OF A DENTAL RESTORATION

CROSS-REFERENCE TO RELATED APPLICATIONS

This application is a National Stage application of International patent application PCT/EP2018/055821 filed on Mar. 8, 2018, which claims priority to European patent application No. 17159883.2 filed on Mar. 8, 2017, the disclosures of which are incorporated herein by reference in their entirety.

FIELD OF THE INVENTION

The invention relates to a computer program or a computer-implemented method for specifying a material color of a dental restoration.

BACKGROUND OF THE INVENTION

It has been known for long to use so-called tooth keys in which typically a plurality of tooth colors may be used in the form of sample teeth to determine the optimum tooth color of the dental restoration material. For this purpose, a neighboring tooth of the tooth to be treated is used as a basis, or possibly also the color of both neighboring teeth. The sample tooth is compared to it or them visually and the sample tooth most suitable from among for instance 16 sample teeth is selected. Typically, the tooth colors are grouped into the categories A=reddish-brownish, B=reddish-yellowish, C=shades of gray and D=reddish-gray, wherein a brightness graduation is respectively carried out from 1 to 4, that is to say A1=light reddish-brown and A4=dark reddish-brown.

It is known that a comparison of this type by means of tooth keys does not always lead to optimum results. For instance, the lighting situation is relevant for judging the color similarity, and the lighting situation differs considerably depending on the surroundings, wherein it is also an issue if artificial light, daylight or a combination of both is used.

Numerous attempts have been carried out to select the tooth color of the dental restoration material with an improved result, in most cases by analyzing the target tooth color, that is to say the tooth color of the neighboring teeth, more thoroughly, possibly by means of scanners. Attempts have been made to achieve an improved result in a computer-aided fashion in this respect. For this purpose, it is referred to the solution according to U.S. Pat. No. 6,345,984 B2, for instance.

A significant improvement compared thereto may be taken from EP 2 255 749 B1. In this solution, a dental color key is used as is the case also already according to DE 10 509 830 C2. The directly adjacent arrangement weakens the influence of different angles of incidence of light.

However, there is a need for optimizing the tooth color determination, especially as in case of different patients also with respect to the same target tooth color the determination of tooth colors is met with varying success.

SUMMARY OF THE INVENTION

In contrast, the invention is based on the task of providing a method or a computer program, respectively, to specify a material color of a dental restoration, which avoids disadvantages of the known solutions and is optimized in a patient-specific manner.

This task is inventively solved by the claim 1. Advantageous developments may be taken from the subclaims.

According to the invention, it is provided preferably that further parameters are provided in addition to certain parameters such as the target tooth color, that is to say the tooth color of the neighboring tooth, and that the material color is specified in an optimized manner automatically or at least suggested.

This is explained in greater detail below using the example of the execution of the inventive computer program on a suitable portable terminal device.

Generally, the dentist or dental technician is responsible for detecting the desired tooth color of the dental restoration to be produced (and possibly of the color of the available tooth stump), wherein for instance dental color keys known per se may be used for comparison or else for determination of the tooth color of the neighboring tooth or generally of adjacent teeth. However, it is worth mentioning that determination of the target tooth color based on adjacent intact teeth may also be carried out autarchically, in a computer-controlled fashion and thus automatically.

However, in addition to the visual determination of the tooth color referred to as target tooth color, no further step or mental act of the dentist or dental technician is required inventively.

According to the invention, the determination of the material color or else the suggestion of alternative colors of the material for the dental restoration to be produced is performed by the computer program. For this purpose, the computer program asks the user to enter the target tooth color. This input may be performed by offering different possible selections on a suitable output device (for instance on a touchscreen display), and by tapping or wiping, by contactless input such as voice input or by a suitable movement of the portable terminal device.

It is to be understood that the computer program is fed with signals produced by a suitable sensor technology of the portable terminal device by means of the above-mentioned actions such as tapping, wiping etc. In this respect, the input of the target tooth color which is requested by the computer program and is exemplary for all parameters to be input at this point is concluded based on these signals. The target tooth color input in this way is now available to the computer program as a parameter for determination of the material color of the dental restoration to be produced.

After the first parameter has been successfully gathered and stored by the computer program, the display on the output device is changed in a program-controlled way such that the input of the target tooth color is displayed as not necessary anymore, for instance by so-called "graying-out" of the displayed input field.

In addition to the input field for the target tooth color, the inventive computer program displays further parameter categories such as "stump color", "indication", "layer thickness" etc. on the output device of the portable terminal device. Initially, the computer program now requests the selection of one of these further parameter categories. This may be concluded in the already described manner further above by tapping, wiping, etc. Subsequently, the computer program asks the user to enter the corresponding parameter, for instance the stump color. Once the computer program has gathered and stored this further parameter, again in the manner described further above by tapping, wiping, etc., it is checked in a program-controlled manner if all the values available in the program can still be displayed for selection due to the combination of both the already gathered parameters of target tooth color and stump color from the parameter categories to be requested next. Due to certain combinations of already gathered parameters and tables stored in the program (on the basis of admissible and inadmissible parameter combinations determined empirically in advance) the value ranges to be offered for selection are possibly limited in their value ranges in a program-controlled manner for the parameters of further parameter categories to be requested next.

This inventive program-controlled value limitation makes it possible to exclude value combinations from the start which would not allow for a satisfactory restoration result.

As has been mentioned already, the influence of the parameters from the different parameter categories on each other is determined elaborately by empirical research and stored in the form of data sets or else tables in the inventive computer program. This influence results from the optical properties of the materials to be used, such as the restoration material itself and the dental cement, from the geometries of the layers of the dental restoration which also have a large influence on the optical effect, and additionally from the color of the tooth stump or abutment to which the dental restoration is to be attached, etc. The production technology, adhesive technology and the type of restoration (indication) also have significant influence on the final appearance of the dental restoration to be produced.

The indication, that is to say the type of the restoration to be produced, comprises at least veneers, crowns, inlays, onlays, copings, and may additionally comprise bridges, abutments, occlusal veneers (table tops). In addition to a single-layered (monolithic) construction of the dental restoration to be produced, it may also consists of a multi-layered construction when the programming of the inventive computer program is adapted correspondingly.

Due to the program-controlled limitation of the value ranges of the individual parameters from the different parameter categories to "useful" values, maloperation by the user is excluded almost completely, as only combinations of parameters are allowed which guarantee a satisfactory result. Linkage of these parameters is realized by the inventive computer program and their plausibility is checked.

As a result of the complete request of all necessary parameters, the computer program outputs a material color or several alternatives, wherein the output may be performed graphically on the display device of the portable terminal device and additionally is also possible as a voice output for instance.

In this respect, a further important parameter is the color of a stump—or of an abutment—, which abutment is equivalent to a stump in this respect.

However, in an inventively surprising manner, the layer thickness of the dental restoration is particularly important, apparently it has also a particularly large influence on the color effect. Subject to the same target tooth color and the same stump color, for instance a dental restoration with a layer thickness of 0.3 mm will then have a considerably different color effect than a dental restoration having a layer thickness of 1.5 mm when the stump color and the target tooth color differ from one another considerably.

This is considered automatically inventively, and surprisingly this results in a considerably improved specification of the tooth color of the dental restoration material which is closer to nature in this respect.

The inventive method may be realized on a computer for instance in the form of a program of a CAD/CAM software or separately therefrom. However, the realization as an app on a tablet or smartphone is particularly preferred. In this regard it is irrelevant if the computer program is executed locally on the corresponding device, such as the tablet or smartphone, or on a remote computer (cloud) to which a connection exists via a correspondingly suitable terminal device (PC, tablet, smartphone).

Particularly through realization of the inventive computer program on a remote computer or else server, that is to say in the cloud, it is possible additionally to realize a self-learning and self-optimizing system by feedback of the users which may consider the experiences of the many individual users advantageously.

Inventively, the translucency of materials such as all-ceramics or composites is considered especially greatly by means of gathering the layer thickness of the dental restoration; the differences existing in this respect are also considered particularly preferably inventively.

A facultative bright shift is carried out in an inventively preferred manner. For this purpose, it is referred to the following example: The target tooth color shows A2. The stump color of the prepared tooth is A4. Typically, A2 is selected to be the color of the dental restoration material as this color also corresponds to the target tooth color. However, the influence of the relatively dark stump color shifts the color effect of the dental restoration and the result rather corresponds to the tooth color A3.

Then, the result is unsatisfactory as it is almost impossible to correct restorations which are too dark to become brighter.

However, in situations of this kind, depending on the layer thickness, A1 is inventively suggested or chosen right from the start as the material color of the dental restoration material, in particular in case of thinner layer thicknesses. However, in case of a layer thickness of 1.5 mm and materials having a lower degree of translucency A2 is maintained.

An advantage of the bright shift is that it is also possible to adjust the color by means of a painting technique after completion of the restoration, if necessary.

In this context it must be pointed out that the desired restoration result also depends on the expectations and habits of the patients. In the US, for instance, a brighter appearance of the dental restoration is considered aesthetic. In this respect, preferences of this type can also be taken into account in the inventive computer program by default settings to be made.

According to the invention, it is particularly favorable that the monolithic and translucent materials used nowadays allow for an optimized selection of colors especially with regard to different layer thicknesses. Typically, in case of more recent restorations there is no opaque framework structure and a particularly translucent material is chosen. The restoration is to have an "ethereal" effect and accordingly has a substantially improved optical appearance than the former mainly fixed restorations with fully veneered framework structures.

However, especially with regard to more recent dental restorations of this type it is particularly important to take into account the additional parameters such as translucency and thus indirectly layer thicknesses.

Besides the parameters of target tooth color, stump color or else abutment color, indication or else type of restoration, layer thickness or else preparation depth, material selection, the processing technique may also be used as a further parameter, that is to say e.g. the polishing technique, the painting technique, cutback and the layer technique, and eventually the luting material as the last parameter.

The color selection of the luting material makes it possible to produce minimum color differences particularly in case of translucent restorations; however, it is not possible to have a complete change of color.

By contrast, the material and the processing technique have a relatively great influence especially as it decides on the translucency of the dental restoration.

It is favorable in connection with the invention, to group not only the tooth colors in accordance with the standard patterns, but also the stump colors or abutment colors. For this purpose, there is the so-called ND color key with ND1 as the brightest stump color and ND9 as the darkest stump color.

A particular advantage of the invention is also that certain aesthetically unsatisfactory combinations are marked as such or blocked from the start in a program-controlled manner. If, for instance, a stump color such as ND8 is to be combined with the target color A1, the inventive method shows that this is not possible or leads to unsatisfactory results even if the maximum layer thickness is used and independent of the material. In this case, it may be pointed out to the user that it is recommended to use an opaquer.

According to the invention it is particularly favorable that the translucency is taken into account based on a visual comparison. Presently, digital and electronic color measurements do not allow to measure translucencies reliably.

As the empirical predetermination of the optimum tooth color of the dental restoration has been specified and programmed inventively based on the plurality of the parameters under the same conditions, wrong decisions made by the user due to different lighting situations may be eliminated. The influence of the relatively complex geometry and its interaction with the optical effect of dental restorations is taken into account reliably in a program-controlled manner, whereby the inventive computer program is markedly superior to conventional methods such as the evaluation of the color effect of different layered materials, e.g. in disc shape.

Additionally, the reliable material selection increases the probability that the restoration is what the patient or else the dentist wishes for also with regard to color.

Even if only one layer thickness to be specified is discussed in the further course to ensure a better understanding, it is to be understood that also dental restorations constructed with multiple layers may be configured or else simulated by means of the inventive computer program with corresponding adaptation. Especially with regard to a multi-layered construction it becomes increasingly difficult to reliably estimate the color effect due to the geometries such as curved surfaces of the individual layers and the influence of underlying layers shining through. This is simplified considerably using the inventive computer program in which e.g. by interpolation between the empirically determined color and translucency values of individual layers and layer thicknesses finely graduated intermediate values may also be determined and simulated.

In an advantageous configuration a computer program is provided which changes the material color of the dental restoration with respect to the target tooth color depending on the layer thickness of the dental restoration namely to the effect that in case of a brighter target tooth color and a brighter stump and a larger layer thickness a darker material color is specified, and in case of a darker target tooth color and a brighter stump and a larger layer thickness a brighter tooth is specified.

In a further advantageous configuration it is provided that in case of a darker stump and a brighter target tooth color starting from a predefined difference in brightness the output of a material color is blocked or it is indicated that a solution of this type is unsuitable without an opaquer.

In an advantageous configuration it is provided that the change in material color is performed depending among others on the translucency of the dental restoration.

It is further considered advantageous that the dental restoration is monolithic, that is to say that it consists of one material or else one class of materials and comprises a material color which is the same in itself.

In an advantageous configuration it is provided that the dental restoration is monolithic and built up in several layers or layers having different translucency, and in particular that a vestibular or occlusal layer is more translucent or brighter than an oral or gingival layer.

In a further advantageous configuration it is provided that the brightness of the material color of the dental restoration is increased when the stump color or the abutment color is below a predefined brightness threshold.

In an advantageous configuration it is provided that the specification of the material color of the dental restoration is performed based on the parameters of target tooth color, stump color and layer thickness of the dental restoration, and possibly also based on additional further parameters such as the restoration type, that is to say the indication, the processing technique and the type of luting material.

In a further advantageous configuration it is provided that based on at least one of the above change rules a material color is offered for selection, in particular automatically and particularly preferably in an app of a smartphone or in a CAD/CAM software.

In an advantageous configuration it is provided that the selection is limited based on parameters depending on one another, which parameters comprise in particular the layer thickness, the indication and the material.

In an advantageous configuration it is also provided that in case of a darker target tooth color, such as C4, and a dark stump color, such as ND8, a brighter material color is specified which in particular has a tinge of red, such as LT-B3.

It is also advantageous that the above measure for the layer thickness relates to a thinner central position on the vestibular side of crowns, veneers and copings, in case of inlays and onlays to the thinnest occlusal position.

In an advantageous configuration it is provided that the computer program only offers layer thicknesses larger than or equal to 1.0 mm in case of crowns, inlays and onlays as an indication, layer thicknesses starting from 0.3 mm in case of veneers and copings, and that the maximum layer thickness to be covered is less than 2.0 mm, in particular 1.5 mm.

In an advantageous configuration it is further provided that the selection of the tooth color is performed based on four or five parameters which are present in a tree structure such that upon selection of one of the parameters only the matching ranges of the other parameters are offered, and that the parameters are in particular the tooth color, the indication, the stump color and the layer thickness, and particularly preferably also the material of the dental restoration to be used.

In an advantageous configuration it is provided that impossible combinations of parameters are blocked by the program or displayed as not realizable and/or that based on the layer thickness the tooth color group (A, B, C, D) is adapted if necessary to optimize the visual impression of the material color to be produced.

In an advantageous configuration it is further provided that in a result region of the used app of a smartphone or the CAD/CAM software, both the target tooth color and the recommended material color is displayed and that in the result region the indication is displayed in a graphically approximated manner.

In an advantageous configuration it is provided that on a result screen a further alternative color is displayed and in particular also shown in color possibly in addition to the optimum and recommended material color of the dental restoration part.

In a further advantageous configuration it is provided that on a result screen a free selection of the material color is offered, via which the user may display different material colors for visual comparison with the target tooth color.

BRIEF DESCRIPTION OF THE DRAWINGS

Further advantages, details and features may be taken from the following description of several exemplary embodiments in conjunction with the drawings, in which.

DETAILED DESCRIPTION

Figure 1:
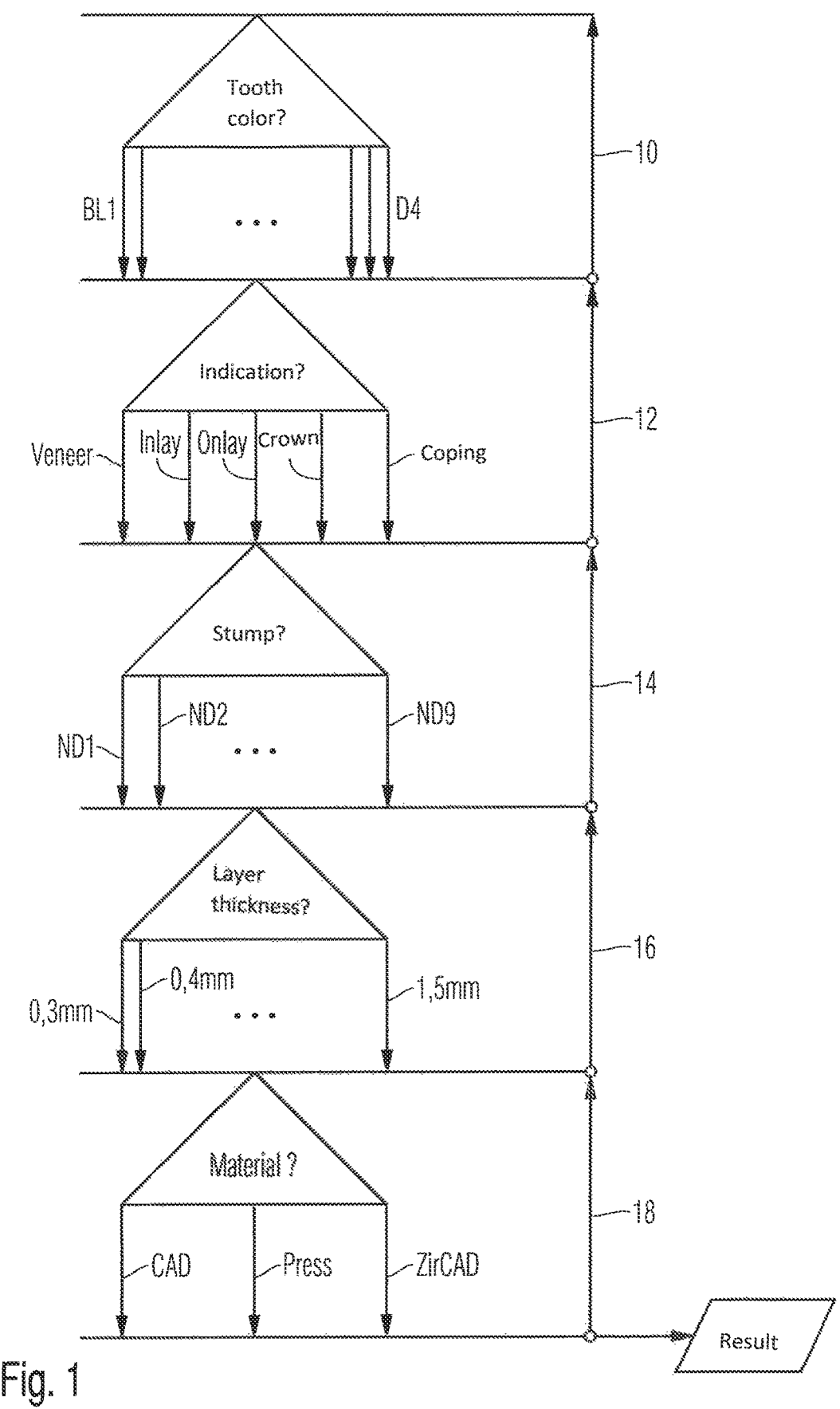
FIG. 1 shows a selection diagram within a computer program of an inventive method in one embodiment.

A possible process diagram of the program for providing the inventive method is illustrated in FIG. 1. The program part illustrated herein relates to the selection of the parameters, of the following parameters in the exemplary case: target tooth color, indication or type of dental restoration, stump color, thickness of the restoration layer and the material used.

A possible process diagram of the program for providing the inventive method is illustrated in FIG. 1. The program part illustrated herein relates to the selection of the parameters, of the following parameters in the exemplary case: target tooth color, indication or type of dental restoration, stump color, thickness of the restoration layer and the material used.

When the parameter field of tooth color is selected, it is possible to select from numerous possible target tooth colors, They comprise the tooth colors BL1 to BL4, A1 to A4, B1 to B4, C1 to C4 and D1 to D4, that is to say 20 tooth colors altogether which are grouped in correspondence with the letters in a way known per se. One corresponding selection field each is available for selecting the tooth color which reflects the respective tooth color for the tooth shape.

The user, that is to say e.g. the dentist, determines the tooth color of the neighboring tooth or the neighboring teeth either based on a tooth key or a mini color key according to EP 2 255 749 B1.

Alternatively, when the inventive method is realized by means of a tablet or a smartphone, the respective tooth color field displayed may also be held next to the tooth without further ado to allow for visual assessment.

In case of smartphones or tablets, the fields in question may be selected via touchscreen in a way known per se, wherein it is to be understood that instead control via a mouse is also possible, especially with regard to the realization as a separate or integrated program on a computer which is also intended for the CAD design. It is also possible to enter the tooth colors via a keyboard or any other suitable input device.

Automatic offering is an essential element of the inventive method. Thus, when a parameter such as the tooth color has been selected, the possible selection jumps directly further to the next parameter and offers the then still available parameters thereat. Any excluded possible selections are displayed e.g. in a grayed out fashion, or it is made clear in another fashion that they are not available for selection.

The empirical determination performed in advance of the color and translucency effect of different combinations of the parameters which were incorporated into the programing of the computer program allows for exclusion of certain combinations of parameters by the inventive computer program. This is described in more detail below.

However, in correspondence with the counter arrow 10 according to FIG. 1 it is also possible to select a changed tooth color again directly after selection of the tooth color. For this purpose, the user shortly taps the parameter field "tooth color" again. The parameter field selected in this way which allows for selection of the possible selections is marked active by a suitable mark.

If no new correction is required, the user is automatically led to the next field. In the exemplary embodiment illustrated, this is the indication wherein the possible selections "veneer", "inlay", "onlay", "crown" and "coping" are available. Basically, these possible selections apply to all tooth colors such that no limitations or else correspondingly grayed-out fields are provided in this respect. Needless to say, in addition to the already mentioned possible selections further indications such as bridges, abutments, occlusal veneers (table tops) and the like and also corresponding materials (e.g. titanium for abutments) are also possible by a corresponding extension of the programing.

Here, too, there is the possibility of performing correction, corresponding to the counter arrow 12. Then again, the user may return to the tooth color again and thus follow the counter arrows 12 and then 10.

When no corrections are desired, the next possible parameter selection appears automatically, which is the stump color in the present case. Now it is possible to select between the bright stump color ND1 and the dark stump color ND9 but also to select the intermediate stump colors ND2 to ND8.

Then again, here too, the same correction possibility is available analogously by following the execution path according to counter arrow 14.

The next possible selection applies to the layer thickness of the dental restoration. Here, substantial limitations are already provided as soon as the indication has been selected. Thus, veneers may be specified with a thickness of between 0.3 mm and 1.5 mm, that is to say with all 12 possible selections. But inlays or onlays may only be provided with a minimum depth of 1.0 mm such that in this case only the 6 possible selections from 1.0 mm to 1.5 mm are illustrated as active. As a result, layer thicknesses of less than 1.0 mm are automatically illustrated as excluded by the computer program—they are displayed in a grayed-out fashion and are not available anymore for selection as a possible parameter.

The selection "crown" also offers the possibility of selecting a layer thickness of between 1.0 mm and 1.5 mm, but not less. In case of the indication selection "coping" the selection of 0.3 mm is blocked while the remaining possible selections are available.

Now, when the user changes his/her mind with regard to the displayed selection as it were and selects e.g. another tooth color and follows the counter arrows 16, 14, 12 and 10 in this respect, the selections made up to now—provided that they are adequate—remain unchanged, and only the appropriate possible selections are offered now.

However, this means that when e.g. the value of 0.3 is set for the layer thickness and then the user returns to the indication up to the counter arrow 12, only "veneer" remains for selection as only the indication "veneer" is available for the layer thickness of 0.3. In this respect, here, too, the selection is automatically limited to the combinations realizable in the production of the dental restoration by the computer program based on the combination of the parameters already entered.

If no correction is made it is possible to select the material wherein the materials CAD, Press and ZirCAD are available in the exemplary embodiment illustrated. As has already been mentioned further above, further materials such as titanium (for abutments) may be added when the programming of the computer program is extended.

It is to be understood that any other materials may also be offered in this respect, such as also explicitly composite, lithium disilicate or the like.

Now, here, it is also possible to change the selection made up to now corresponding to the counter arrow 18.

When all the selections have been made, which is shown by corresponding marks of the parameter fields, the display of the result is inventively activated instead of selection fields. Here, "generate result" may e.g. be displayed, and a result screen is now displayed upon this selection. The result screen shows both the selected tooth color in the shape of a tooth and the material color, and additionally the material color name such as HT BL1 or the like. "HT" indicates a material of high transparency.

The suggested material color is made up of the stump color, the transparent cement and the restoration color wherein the layer thickness of the restoration in correspondence with the indication is also taken into account by the computer program. The total color of the dental restoration is then illustrated like it would be represented in the mouth of the patient.

In addition to this, the dental restoration material to be produced is also illustrated symbolically with the determined material color corresponding to the indication.

It is to be understood that in addition to a graphic output on a result screen a voice output may also be performed for instance.

In an advantageous configuration it is provided that a preferred material color, i.e. the primary material color, and additionally a secondary material color is displayed, and in a further advantageous configuration also free possible selection additionally.

Then, the user has the opportunity of illustrating the different results next to one another and of optimizing them visually or else by comparison with the target tooth color.

In a further advantageous configuration it is also possible either to make a correction based on the determined result, to illustrate the underlying parameters, to print the result or to send it.

Figure 2:
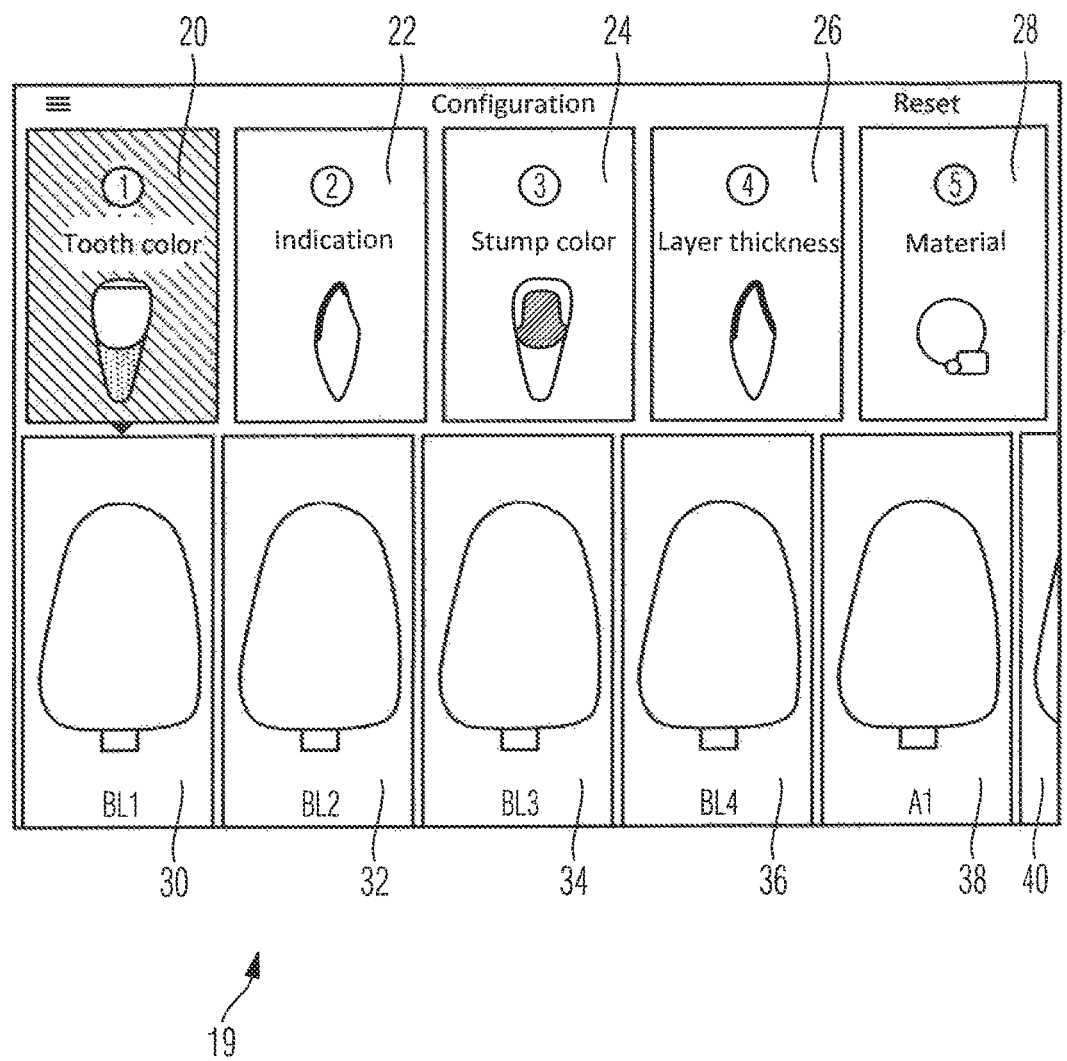
FIG. 2 shows a selection view for a target tooth color in the embodiment according to FIG. 1.

A selection screen 19 is illustrated in FIG. 2. Parameter fields 20, 22, 24, 26 and 28 which are labeled "tooth color", "indication", "stump color", "layer thickness" and "material" are in the upper region of the selection screen. The parameter field which is active respectively, the parameter field 20 in the present state, is marked or has a dark background.

Selection fields 30 to 40 are in the bottom region of the selection screen 19. The visible selection fields are labeled as follows:

Selection field 30-BL1
Selection field 32-BL2
Selection field 34-BL3
Selection field 36-BL4
Selection field 38-A1

Figure 3:
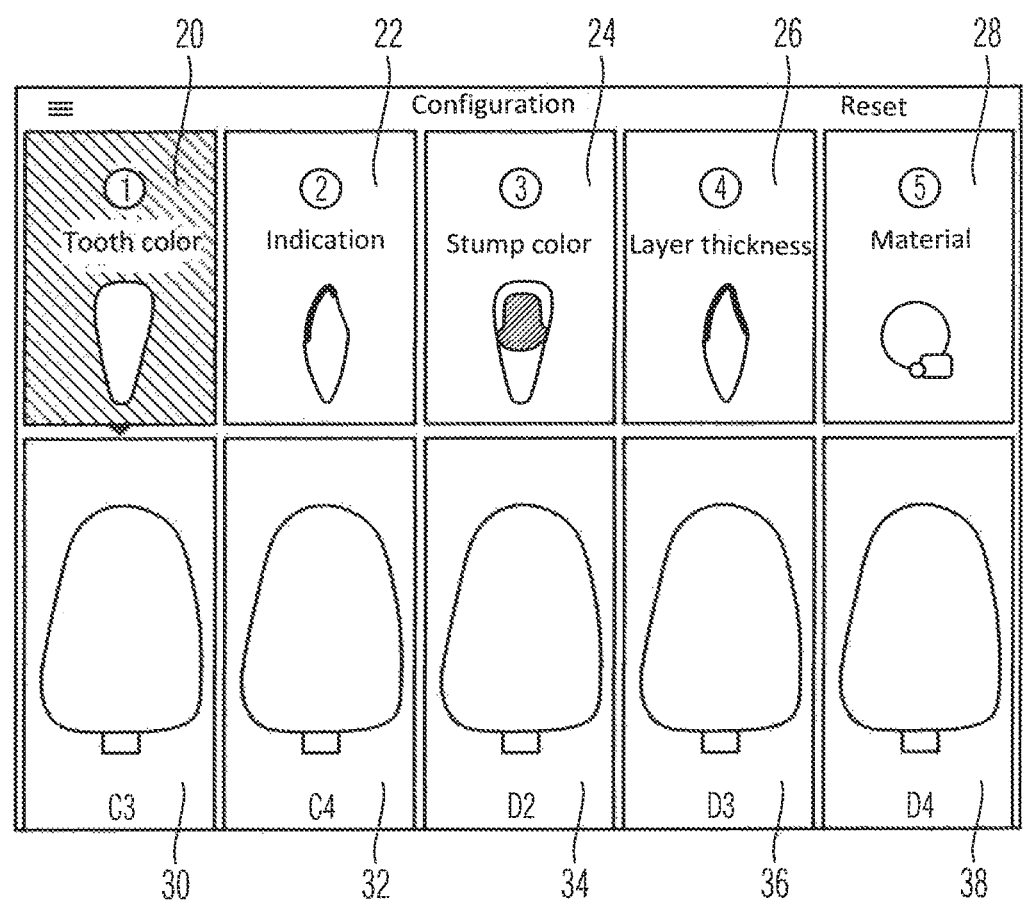
FIG. 3 shows a view according to FIG. 2, however illustrating other target tooth colors.

Next to them, a selection field 40 is partly visible which would correspond to the selection field A2. By a corresponding "swiping" finger gesture, any desired section of 5 or 6 tooth colors from the visible field string or strip of the possible 19 target tooth colors may be displayed, the tooth colors C3, C4, D2, D3 and D4 according to FIG. 3.

Figure 4:
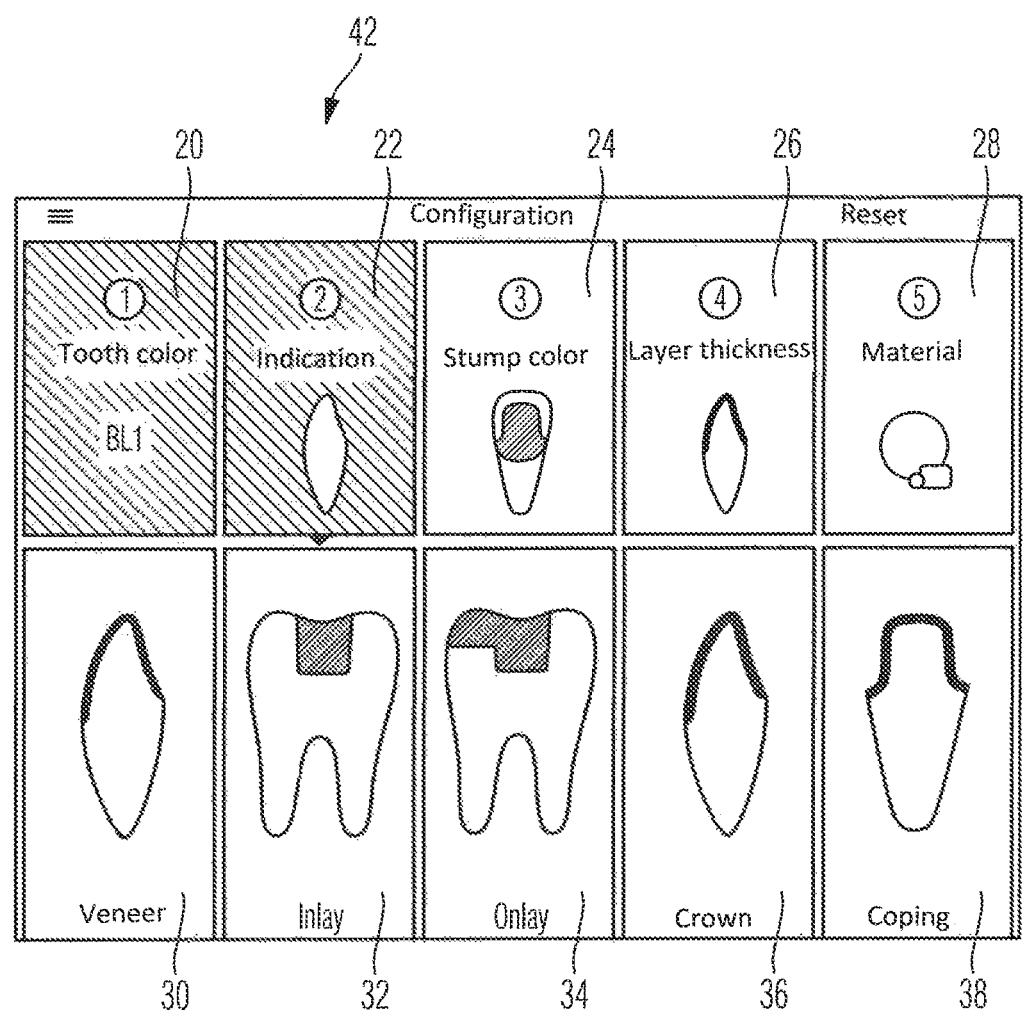
FIG. 4 shows a view according to FIG. 2, wherein, however, a tooth color has already been selected and the indication is due for selection.

By tapping one of the selection fields, the respective selection field is selected, and without further measures a change of screen is immediately performed to the selection screen 42 according to FIG. 4. The parameter field 20 with the selected tooth color "BL1" continues to be marked dark, and at the same time the parameter field 22 is marked while the selection fields 24 to 28 are unmarked.

Figure 5:
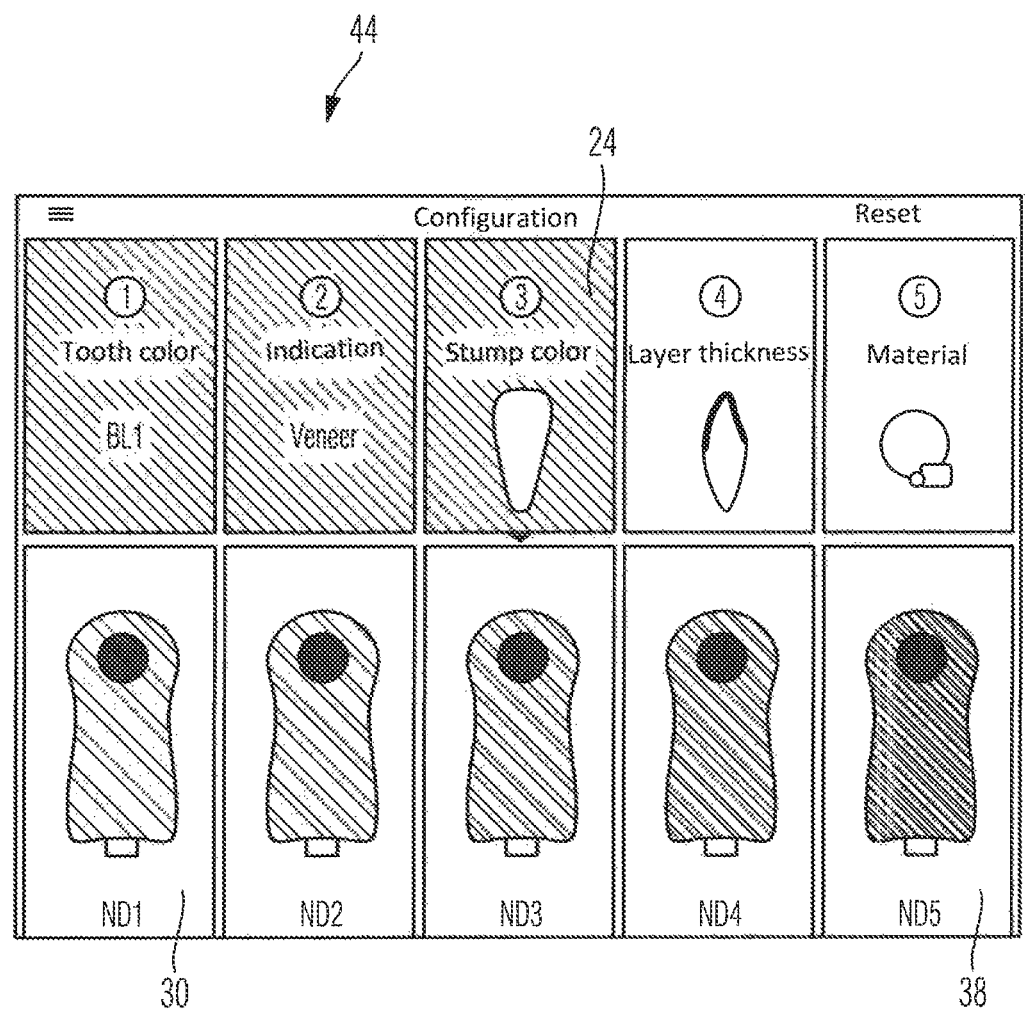
FIG. 5 shows a view according to the FIGS. 2 to 4, wherein both the tooth color and the indication have been selected and the stump color is due for selection.

Accordingly, the selection fields 30 to 38 show the different indications or restoration types, namely the selection field 30 a veneer, the selection field 32 an inlay, the selection field 34 an onlay, the selection field 36 a crown and the selection field 38 a coping. By tapping the desired selection field, the selection is triggered and the selection screen 44 according to FIG. 5 appears. The parameter field 24 "stump color" is active and five stump colors are displayed in the region of the selection fields 30 to 38, ND1 to ND5 in the illustrated exemplary embodiment, wherein it is also possible to arrive at another selection up to ND9 by scrolling.

Figure 6:
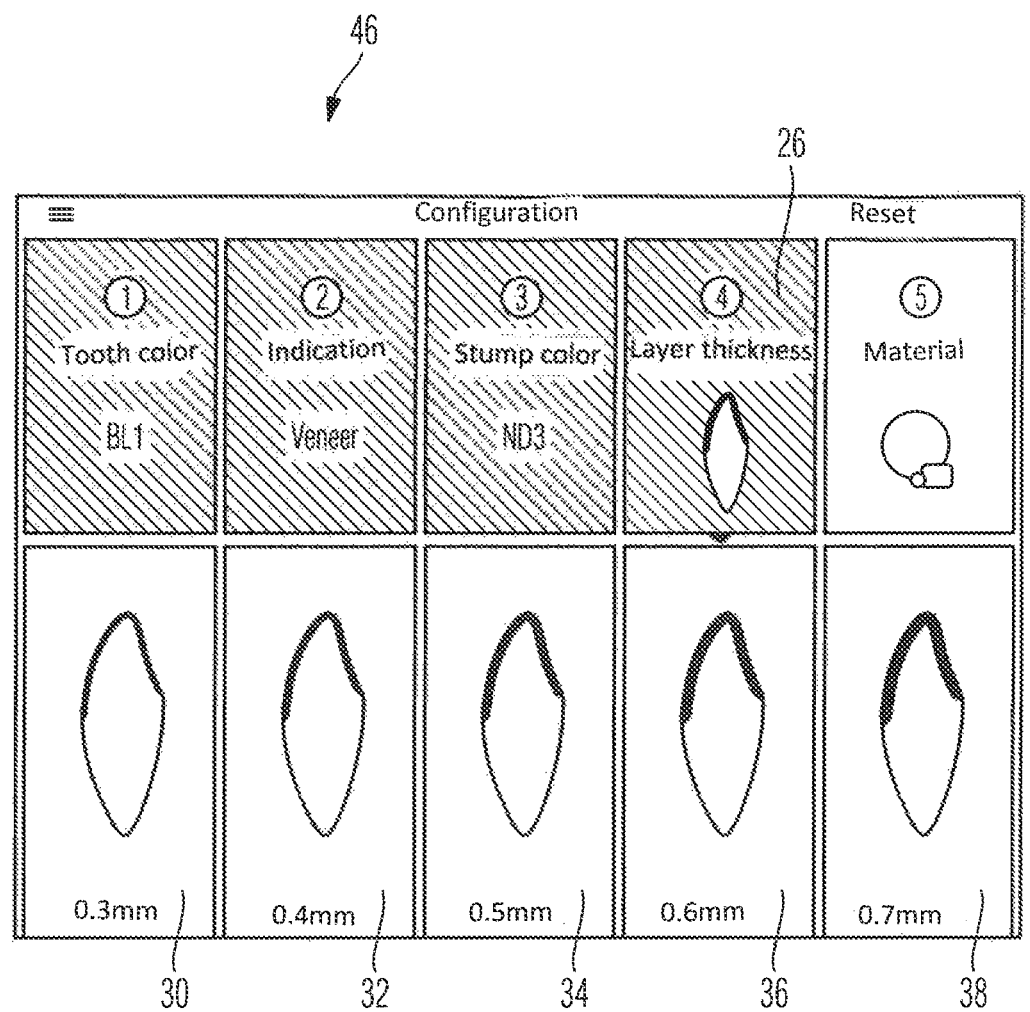
FIG. 6 shows a view according to the FIGS. 2 to 5, wherein tooth color, indication and stump color have been selected and the layer thickness is due for selection.

By selection of the stump, the screen changes again to FIG. 6 with the selection screen 46 for selecting the layer thickness in the parameter field 26. In this way, the layer thicknesses possible in correspondence with the indication are shown as active and may be selected, wherein impossible layer thicknesses are shown as not active and thus grayed out. Thus, the not possible and in this respect not active layer thicknesses may not be selected by the user at all, they are automatically blocked by the computer program. Thus, maloperation by the user is excluded.

Figure 7:
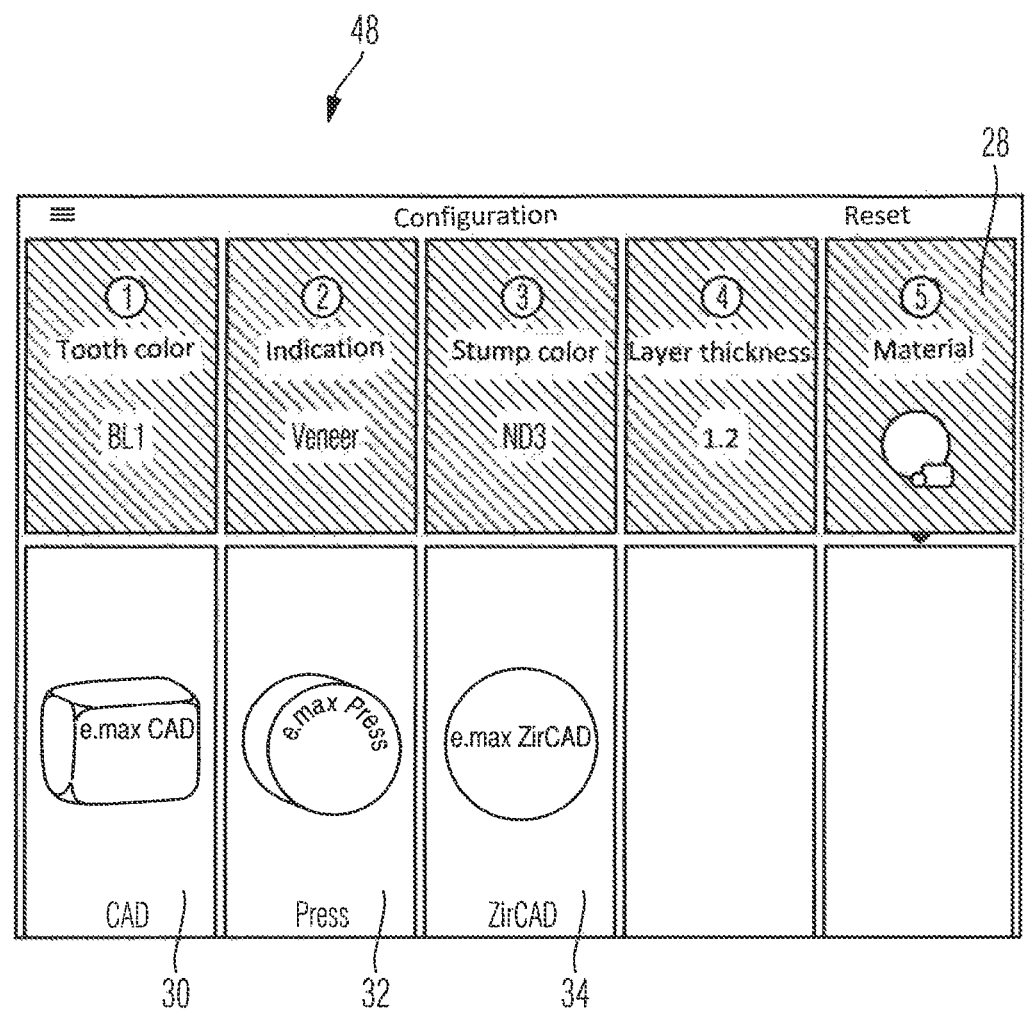
FIG. 7 shows a view according to the FIGS. 2 to 6, wherein tooth color, indication, stump color and layer thickness have been selected and the material is due for selection.

In accordance with the selection screen 48 in FIG. 7, the material to be used is still to be specified with the parameter field 28, wherein CAD, Press and ZirCAD are possible.

Once the respective selection is made, a not illustrated intermediate screen appears which offers the possibility of generating the result, wherein, however, a correction of the selection is additionally possible in accordance with the counter arrows in FIG. 1.

Figure 8:
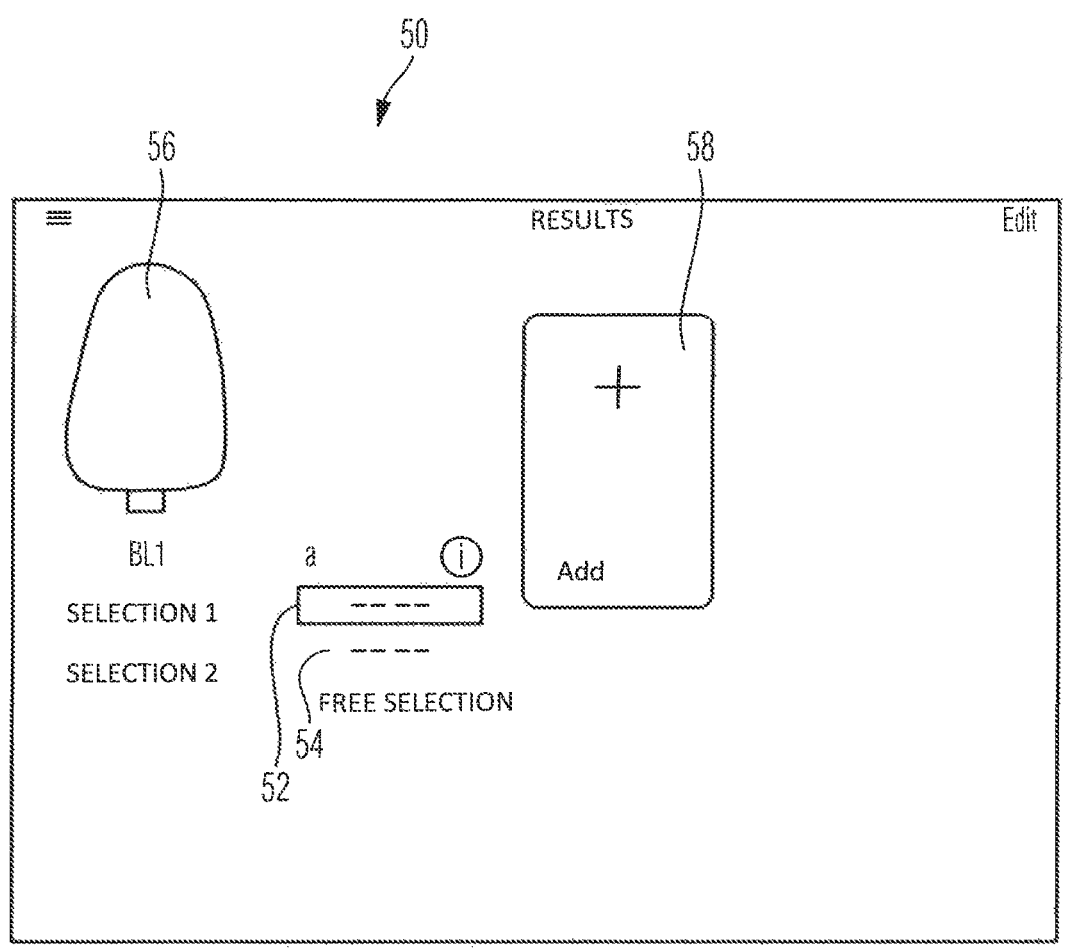
FIG. 8 shows an illustration of a result field, wherein there is no suitable selection according to the illustration such that no result is obtained.

Once "generate result" is tapped, the result screen according to FIG. 8 appears. The following combination was selected in the exemplary embodiment illustrated: Tooth color BL1, veneer, ND3 as stump color and 1.2 as layer thickness and "Press" as material.

Although the stump color ND3 is not particularly dark, it may not be combined with BL1 such that the result would be satisfactory. Thus, in accordance with FIG. 8, no result is displayed in the primary result field 52 and in the secondary result field 54. By contrast, the target tooth color 56 is illustrated both as a letter/number combination and as a correspondingly shaped and shaded tooth in the left region. Via the "add" field 58 a further selection may be made if necessary.

The missing suggestions in the result fields make clear to the user in a program-controlled way that the combination of the parameters selected in advance would not lead to the desired result and thus a correction to at least one of the input parameters is necessary.

Figure 9:
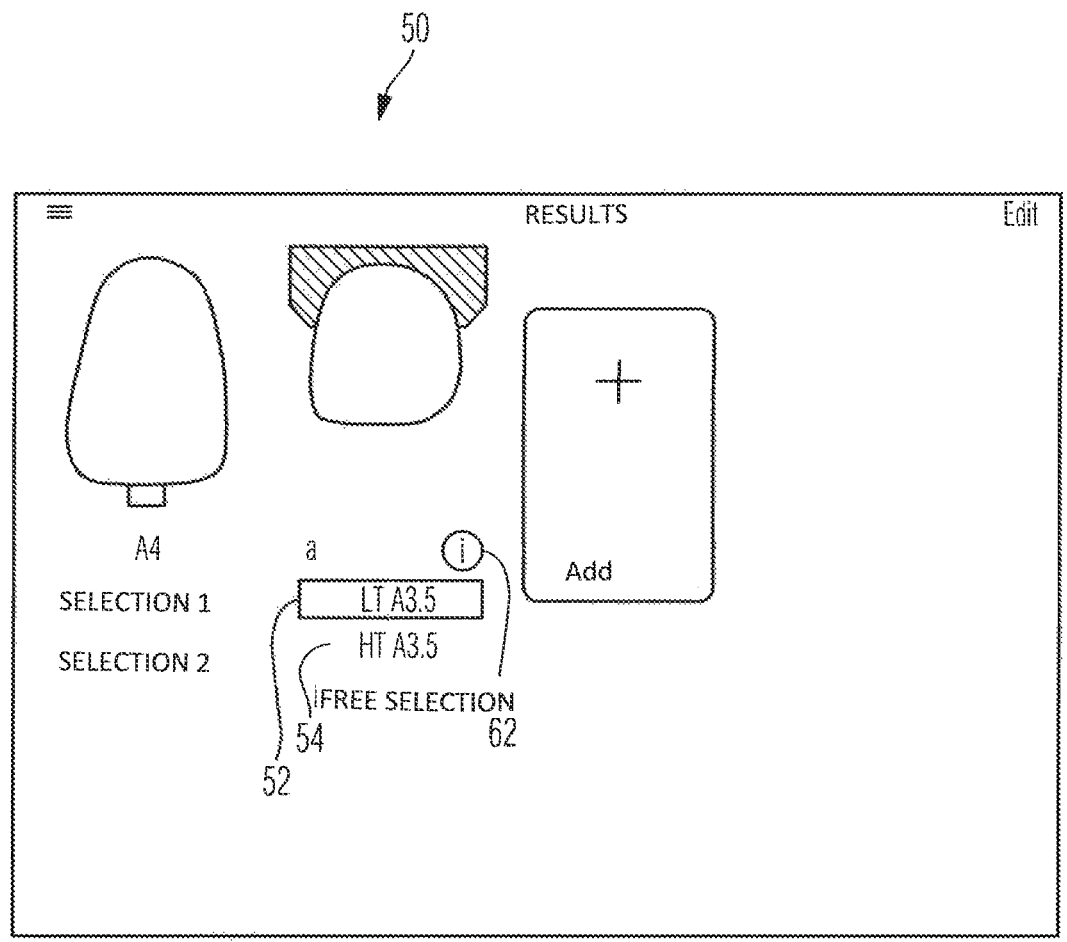
FIG. 9 shows an illustration of the result field according to FIG. 8, wherein a result is shown.

An alternative result screen 50 is illustrated in FIG. 9. Here, instead of the tooth color BL1 the tooth color A4 was selected. Here, it is possible to prepare a useful restoration in an aesthetically particularly satisfactory manner. LT A3.5 is suggested as a material tooth color in the primary result field 52. In the secondary result field 54 HT A3.5 is suggested. A result image is illustrated in a region 60 which is to illustrate a veneer with the determined primary result field tooth color.

Figure 10:
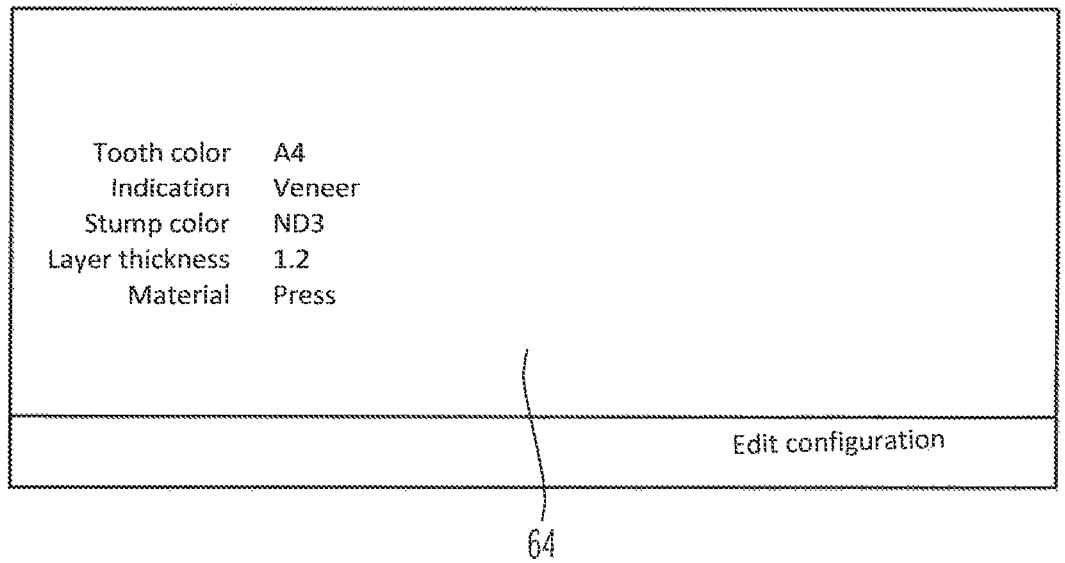
FIG. 10 shows an illustration of an information field with regard to FIG. 9 which reflects the parameters of the result.

By tapping an information icon 62 the underlying parameters may additionally be displayed again according to FIG. 10, that is to say A4, veneer, ND3, 1.2 and Press. Here, the configuration may be edited again via a field 64 if necessary.

By way of example, it is referred to the following results of the following compilations of parameters.

| target tooth color | indication | stump color | layer thickness | material | material color |
|---|---|---|---|---|---|
| A3 | inlay | ND4 | 0.3 | CAD | not possible |
| A3 | inlay | ND4 | 0.6 | CAD | not possible |
| A3 | inlay | ND4 | 1.0 | CAD | HT BL2 |
| A3 | inlay | ND4 | 1.2 | CAD | HT BL4 |
| A3 | inlay | ND4 | 1.5 | CAD | HT BL4 |
| A3 | veneer | ND4 | 0.3 | CAD | not possible |
| A3 | veneer | ND4 | 0.6 | CAD | not possible |
| A3 | veneer | ND4 | 0.9 | CAD | MT BL2 |
| A3 | veneer | ND4 | 1.2 | CAD | MT BL2 |
| A3 | veneer | ND4 | 1.5 | CAD | MT A1 |

As is apparent, the inventive method leads to darker material colors in case of larger layer thicknesses in case of inlays provided primarily occlusally as well as in case of vestibularly visible crowns as the stump may be covered better due to the larger layer thickness and thus has less influence on the total color effect.

Additionally, the "free selection" field 66 according to FIGS. 8 and 9 may display and graphically illustrate any selection from the range of available material tooth colors.

Figure 11:
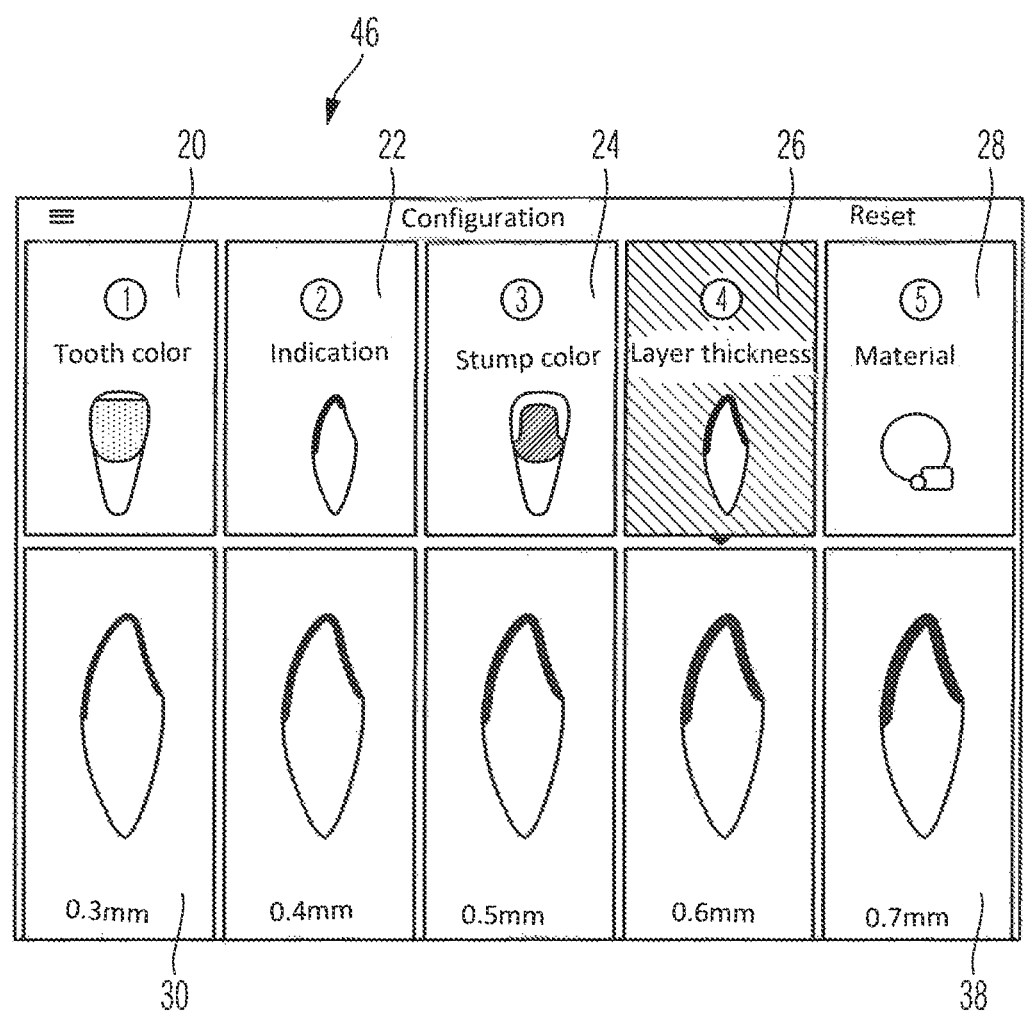
FIG. 11 shows an illustration of a selection screen according to the FIGS. 2 to 7 wherein the layer thickness is due for selection and no further selection has been made up to now.

According to FIG. 11, an alternative selection screen 46 is illustrated. Here, the parameter fields 20 to 26 are not marked and accordingly not dark. By contrast, the parameter field 26 for the layer thickness is active and dark and in the region of the selection fields 30 to 38 possible layer thicknesses are illustrated for selection accordingly. A corresponding state is created when the layer thickness according to the parameter field 26 is tapped first instead of the tooth color. In this state, the tooth color has not been selected yet, but after tapping a certain layer thickness via the fields 30 to 38 possible selection may be made corresponding to the selection screen 19, wherein the layer thickness according to the parameter field 26 remains selected as a matter of fact.

Figure 12:
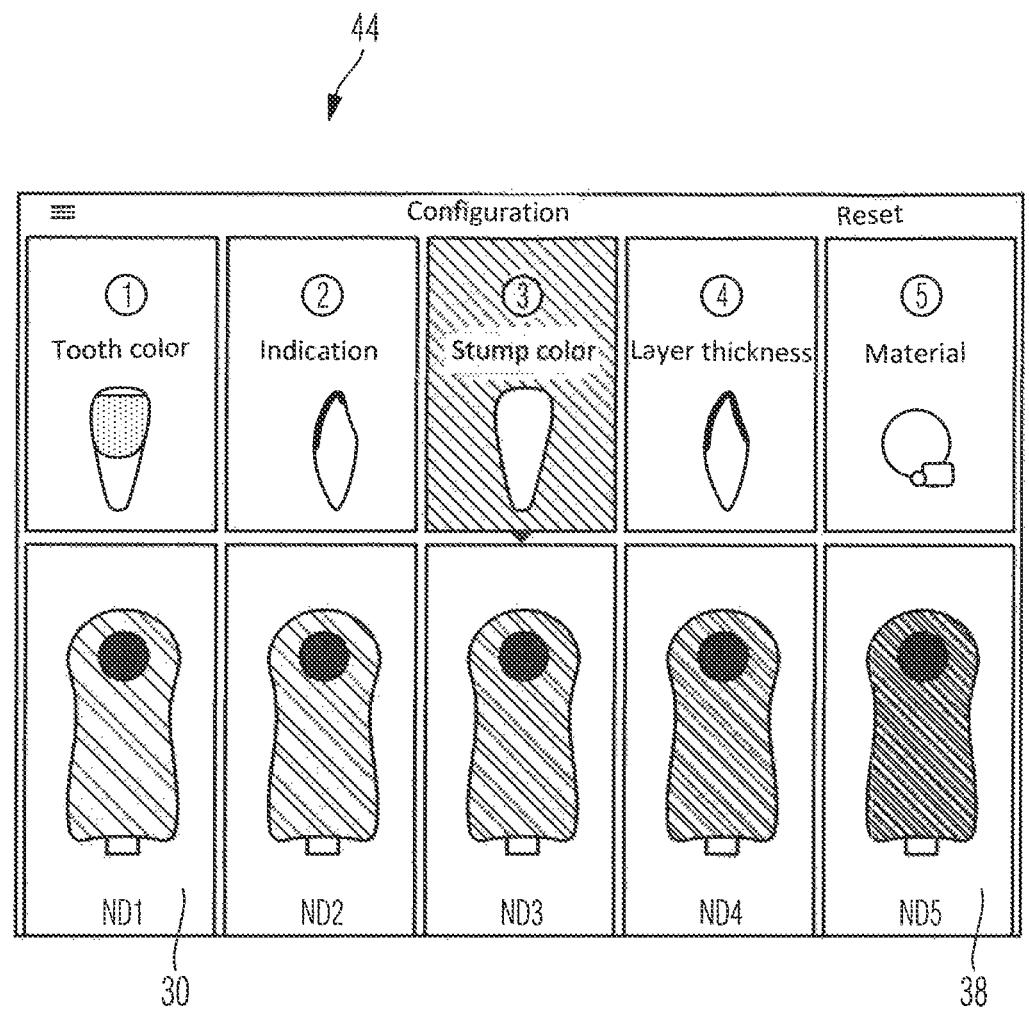
FIG. 12 shows an illustration according to FIG. 11 wherein the stump color is due for selection and no further selection has been made up to now.

This is illustrated analogously in the same manner in FIG. 12 for the stump color 44 according to the selection screen 44 thereat. Here, too, none of the other parameters is specified in advance, and it is possible to select the stump color initially.

Figure 13:
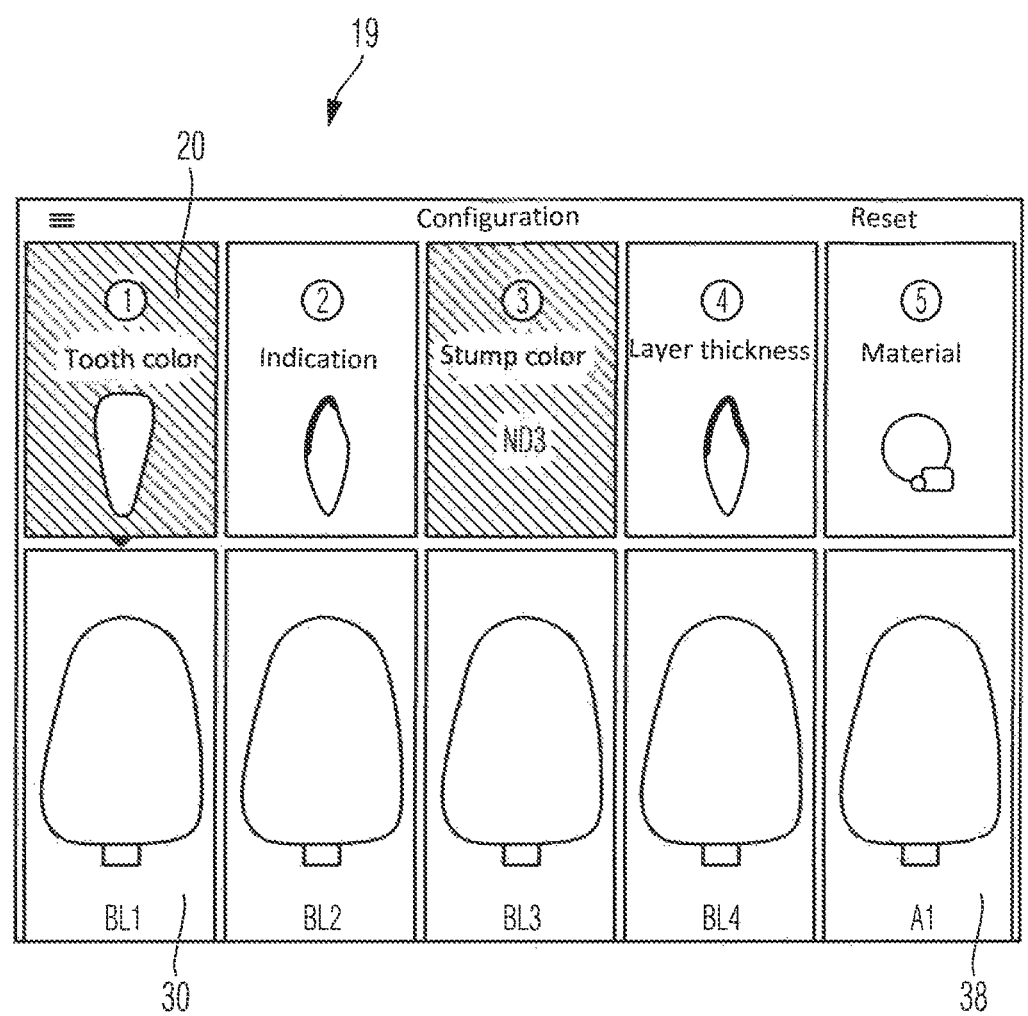
FIG. 13 shows an illustration according to the FIGS. 11 and 12 wherein the stump color ND3 has been selected and the tooth color is now due for selection.

When this is done, the modified selection screen 19 appears according to FIG. 13 in which the tooth color according to the parameter field 20 is marked as active and the tooth color is selectable via the selection fields 30 to 38 accordingly.

The invention claimed is:

1. A computer-implemented method for specifying a material color of a dental restoration, the method executable by an electronic device comprising a computer, smartphone or tablet having a processor and a user interface comprising a keyboard and/or screen and/or mouse coupled to the processor, said method comprising a desired tooth color is entered via the user interface as a target tooth color, said target tooth color being the tooth color of a neighboring tooth, said target tooth color specified as the material color of the dental restoration, upon specification of the material color of the dental restoration starting from the target tooth color the material color of the dental restoration is changed based on one or more parameters selected comprising a color of a stump, a color of an abutment, a layer thickness of the dental restoration, a type of dental restoration, a material of the dental restoration, or a processing technique, wherein, once one of the one or more parameters is selected, a next parameter is offered automatically to the user interface, wherein the selection is limited based on parameters which are dependent on one another, wherein, when all selections have been selected, a display of a result of the material color is generated onto the screen, and wherein the dental restoration is prepared based on the result of the material color.

2. The computer-implemented method as claimed in claim 1, wherein the user interface specifies a change of the material color of the dental restoration with respect to the target tooth color depending on the layer thickness of the dental restoration, wherein the user interface specifies a darker material color for a brighter target tooth color (56) and a brighter stump and a larger layer thickness, and wherein the user interface specifies a brighter material color for a darker target tooth color (56) and a brighter stump and a larger layer thickness.

3. The computer-implemented method as claimed in claim 1, wherein the user interface blocks the selection of the material color of the dental restoration when the output of the resultant material color is unsuitable.

4. The computer-implemented method as claimed in claim 1,
wherein the user interface provides a change in material color based on the translucency of the dental restoration.

5. The computer-implemented method as claimed in claim 1,
wherein the dental restoration is monolithic and comprises a material with the material color.

6. The computer-implemented method as claimed claim 1, wherein the dental restoration is monolithic and built up in several layers of same or different translucency, and
wherein a vestibular or occlusal layer is more translucent or brighter than an oral or gingival layer.

7. The computer-implemented method as claimed in claim 1,
wherein the user interface increase the brightness of the material color of the dental restoration when the stump color or the abutment color is below a predefined brightness threshold.

8. The computer-implemented method as claimed in claim 1,
wherein the user interface specifies the material color of the dental restoration based on the one or more parameters comprising the target tooth color, stump color and layer thickness of the dental restoration.

9. The computer-implemented method as claimed in claim 8,
wherein based on at least one of the one or more parameters, the user interface provides a material color selection, automatically in an app of a smartphone or in a CAD/CAM software.

10. The computer-implemented method as claimed in claim 9,
wherein the user interface comprises a result region in the app of the smartphone or the CAD/CAM software, wherein both the target tooth color (56) and the recommended material color is displayed and
wherein in the result region the type of restoration is outputted in the result region and displayed in a graphically approximated manner.

11. The computer-implemented method as claimed in claim 8,
wherein the specification of the material color of the dental restoration is carried out based on additional further parameters comprising a type of restoration, a processing technique and type of luting material.

12. The computer-implemented method as claimed in claim 11,
wherein the selection is limited based on parameters already specified, which parameters comprise the layer thickness, the type of restoration and the material of the dental restoration.

13. The computer-implemented method as claimed in claim 1,
wherein the user interface specifies a brighter material color of the dental restoration for a darker target tooth color and a dark stump color.

14. The computer-implemented method program as claimed in claim 13,
wherein the brighter material color specified is any amount of the color red, the darker target tooth color is C4, and the dark stump color is ND8.

15. The computer-implemented method as claimed in claim 1,
wherein the layer thickness relates to a thinner central position on a vestibular side of crowns, veneers and copings, and to a thinnest occlusal position for inlays and onlays.

16. The computer-implemented method as claimed in claim 1,
wherein the method offers a plurality of layer thicknesses corresponding to the type of the dental restoration produced comprising layer thicknesses larger than or equal to 1.0 mm for crowns, inlays and onlays, layer thicknesses starting from 0.3 mm for veneers and copings, and
wherein maximum layer thickness is less than 2.0 mm or 1.5 mm.

17. The computer-implemented method as claimed in claim 1,
wherein the target tooth color is selected based on four or five parameters which are present in a decision structure, and
wherein the four or five parameters comprise tooth color, indication, stump color, layer thickness, and material of the dental restoration to be used.

18. The computer-implemented method as claimed in claim 1,
wherein the user interface blocks combinations of parameters when the output of the resultant combination of parameters is impossible and/or
wherein based on the layer thickness the tooth color group (A, B, C, D) needs to be adapted to optimize the visual impression of the material color to be produced.

19. The computer-implemented method as claimed in claim 1,
wherein the user interface comprises a result screen, on which an alternative color of the dental restoration is displayed and shown in color in addition to an optimum and recommended material color of the dental restoration part.

20. The computer-implemented method as claimed in claim 1,
wherein a selection of the target tooth material colors is ouputted in a result screen of the user interface that allows the user to freely select different material colors to be displayed for visual comparison.

* * * * *